(12) United States Patent
Hasegawa et al.

(10) Patent No.: US 6,901,197 B2
(45) Date of Patent: May 31, 2005

(54) MICROSTRUCTURED OPTICAL FIBER

(75) Inventors: Takemi Hasegawa, Kanagawa (JP); Eisuke Sasaoka, Kanagawa (JP); Daizo Nishioka, Kanagawa (JP); Tomohiko Ueda, Kanagawa (JP); Toshifumi Hosoya, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 191 days.

(21) Appl. No.: 10/340,838

(22) Filed: Jan. 13, 2003

(65) Prior Publication Data

US 2004/0136669 A1 Jul. 15, 2004

(51) Int. Cl.[7] ................................................. G02B 6/02
(52) U.S. Cl. ..................................... 385/125; 385/123
(58) Field of Search ................................. 385/122–128

(56) References Cited

U.S. PATENT DOCUMENTS

| 6,301,419 | B1 | * | 10/2001 | Tsukitani et al. ........... 385/123 |
|---|---|---|---|---|
| 6,343,175 | B1 | * | 1/2002 | Sasaoka ...................... 385/123 |
| 6,445,862 | B1 | | 9/2002 | Fajardo et al. |
| 6,526,209 | B1 | | 2/2003 | Hasegawa et al. |
| 2001/0028775 | A1 | | 10/2001 | Hasegawa et al. |
| 2001/0055455 | A1 | | 12/2001 | Hasegawa et al. |
| 2002/0041737 | A1 | * | 4/2002 | Ishikawa et al. .............. 385/43 |
| 2004/0146255 | A1 | * | 7/2004 | Ishikawa et al. ............ 385/114 |
| 2004/0213531 | A1 | * | 10/2004 | Sasaoka ...................... 385/123 |

FOREIGN PATENT DOCUMENTS

| EP | 0 856 759 B1 | 5/2001 |
|---|---|---|
| EP | 1 148 360 A2 | 10/2001 |

OTHER PUBLICATIONS

T. Hasegawa et al., "Hole–assisted lightguide fiber for large anomalous dispersion and low optical loss", Opt. Exp., vol. 9, pp. 681–686, Dec. 17, 2001.

B.J. Eggleton et al., "Grating resonances in air–silica microstructured optical fibers", Optics Letters, vol. 24, No. 21, pp. 1460–1462, Nov. 1, 1999.

Jes Broeng, "Photonoic Crystal Fibers: A New Class of Optical Waveguides", Optical Fiber Technology, vol. 5, pp. 305–330, (1999).

P. Petropoulos et al., "2R–regenerative all–optical switch based on a highly nonlinear holey fiber", Optics Letters, vol. 26, No. 16, Aug. 15, 2001, pp. 1233–1235.

T.A. Birks et al., "Endlessly single–mode photonic crystal fiber", Optics Letters, vol. 22, No. 13, Jul. 1, 1997, pp. 961–963.

* cited by examiner

*Primary Examiner*—Ellen E. Kim
(74) *Attorney, Agent, or Firm*—McDermott Will & Emery LLP

(57) ABSTRACT

An optical fiber suitable for use in a single fiber or multifiber optical connector or array is structured with a core region and a cladding region surrounding the core region, and exhibits a bending loss of a fundamental mode of the fiber at a wavelength $\lambda$ is lower than 0.1 dB/m at a diameter of 15 mm, a mode-field diameter of the fundamental mode at an end of the fiber at the wavelength $\lambda$ is between 8.0 $\mu$m and 50 $\lambda$, and a bending loss of a first higher-order mode at the wavelength $\lambda$ is higher than 1 dB/m at a diameter of 30 mm. The fiber may be multistructured, wherein the cladding region comprises a main medium and a plurality of sub medium regions therein to form a spatially uniform average refractive index.

26 Claims, 14 Drawing Sheets

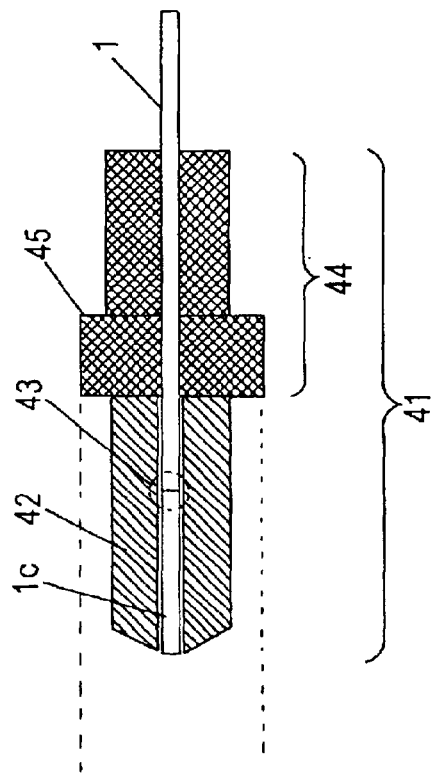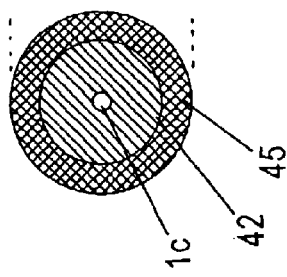
FIG. 9A
FIG. 9B
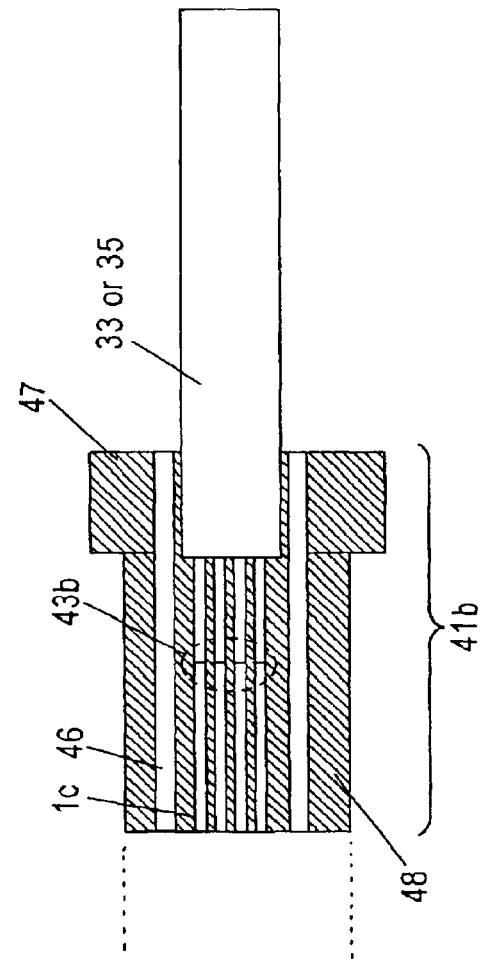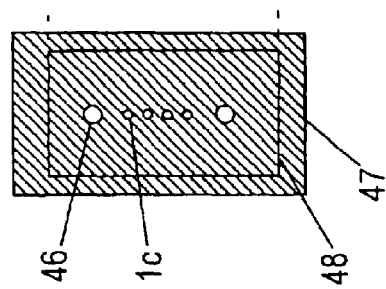
FIG. 10A
FIG. 10B

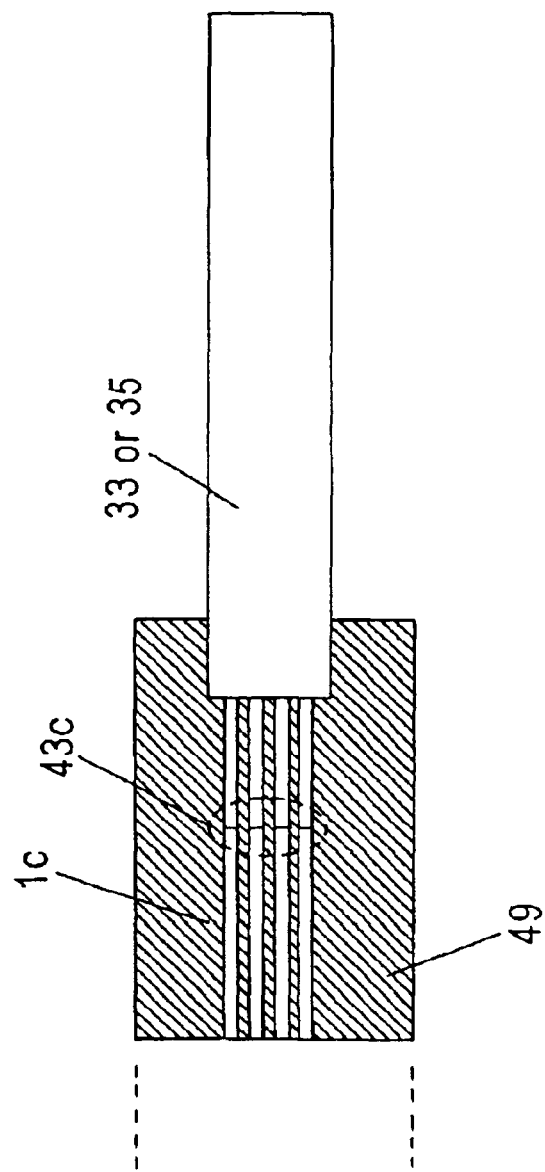
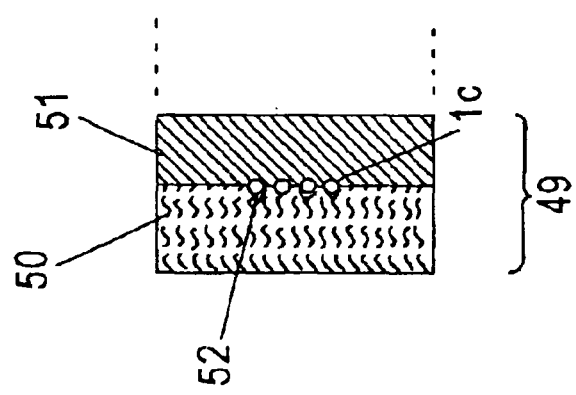

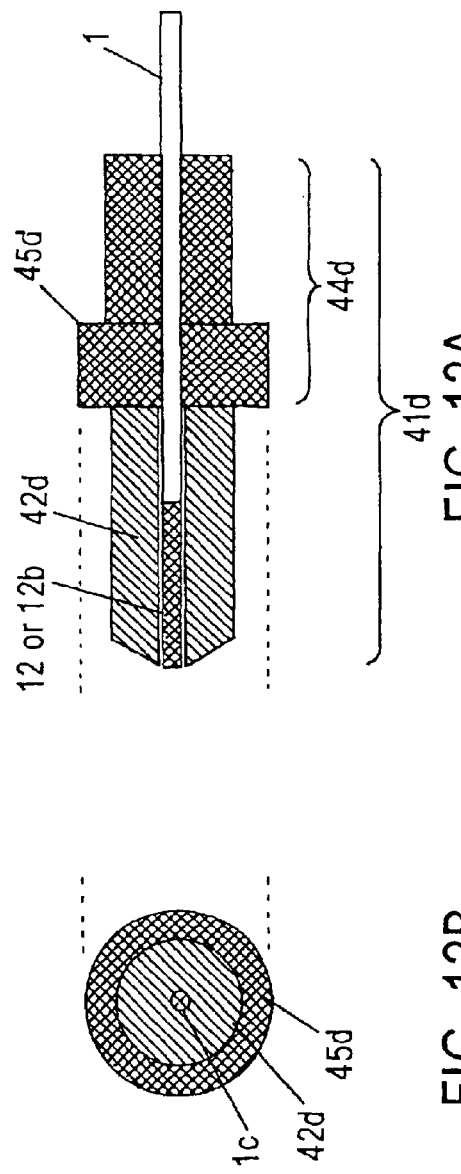
FIG. 12A
FIG. 12B
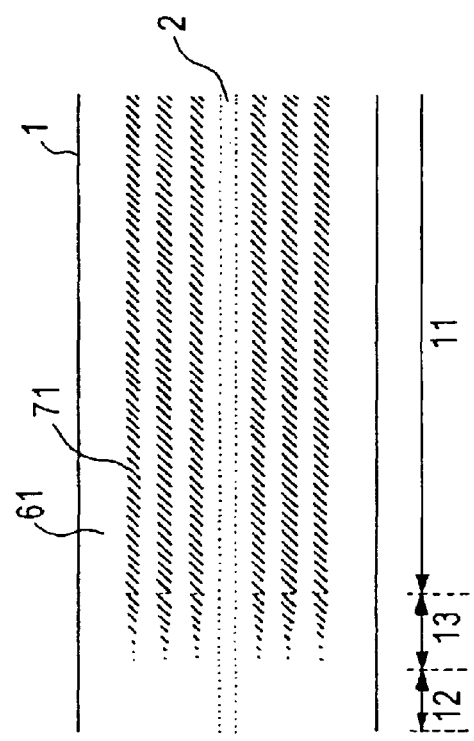
FIG. 13

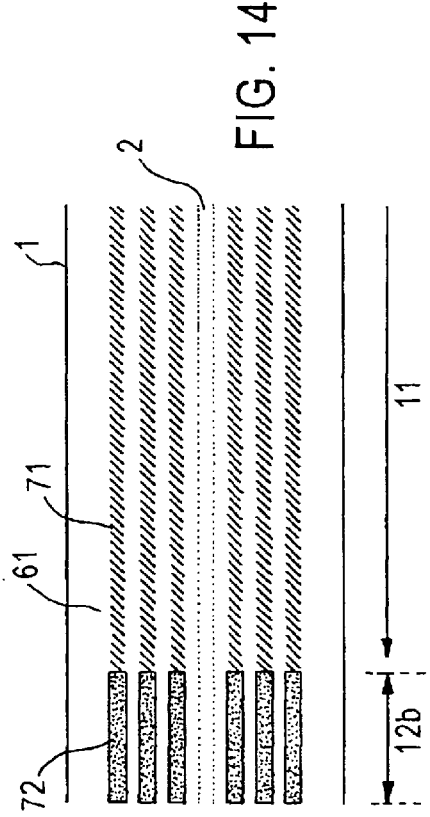
FIG. 14
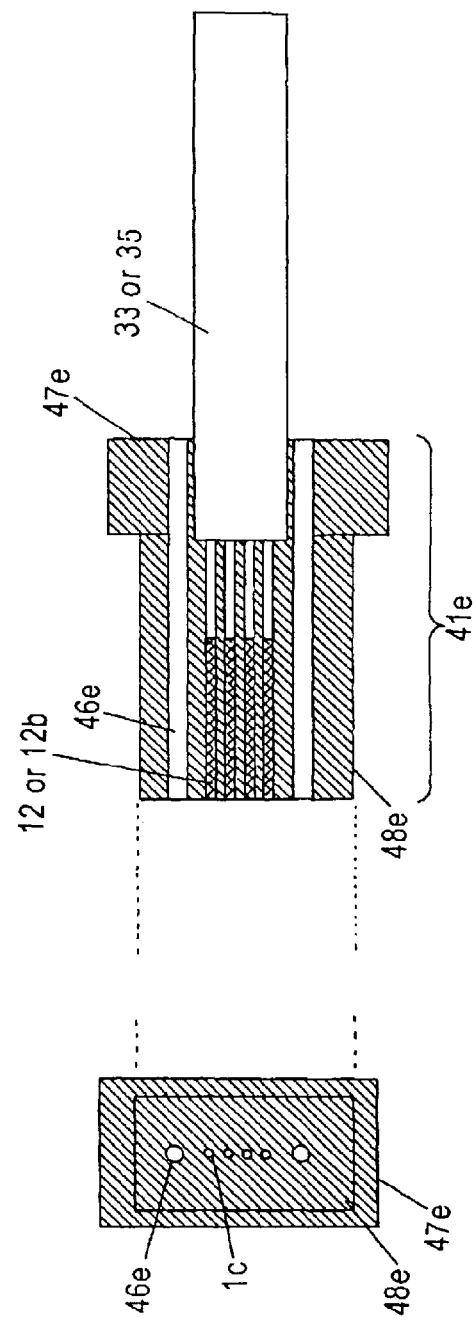
FIG. 15A
FIG. 15B

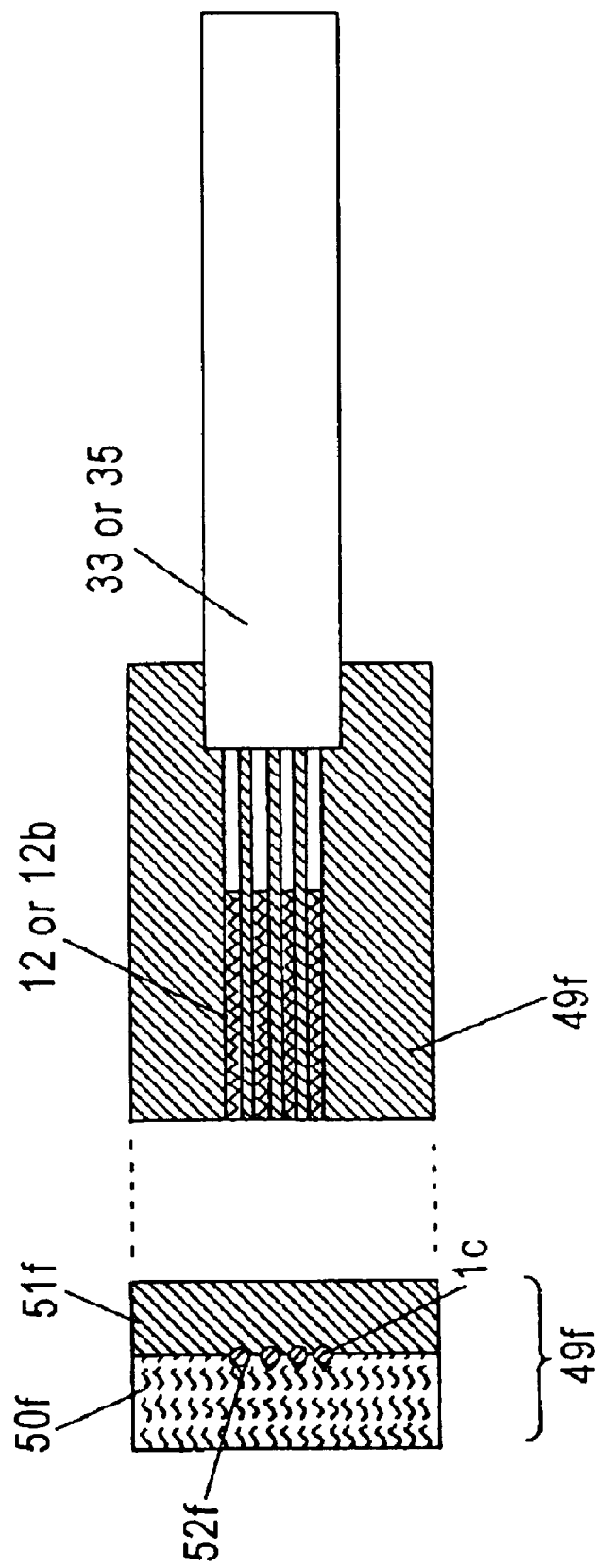

MICROSTRUCTURED OPTICAL FIBER

FIELD OF THE INVENTION

The present invention relates to fiber optic waveguides, more particularly to arrangements of sub medium regions in microstructured optical fibers.

BACKGROUND

A conventional optical fiber is illustrated in FIG. 1. Shown in cross section, a first main medium $5c$, having a predetermined refractive index, is surrounded by a second main medium $6c$, having a refractive index lower than that of the first main medium. The core region $2c$ includes the first main medium, so that a lightwave localizes in the core and propagates over the fiber. The refractive index of the first main medium is typically spatially uniform, while other well-known profiles such as W-shaped profile are possible.

The recent development of the microstructured optical fiber, in which a high index core region is surrounded by cladding having a mix of silica and air, offers new fiber properties by virtue of the large refractive-index contrast that exists between glass and air. A cladding structure may have a spatially uniform average refractive index that can be adjusted to meet a desired relationship with the core index. As described in a paper of J. Broeng et al., published in Optical Fiber Technology, Vol. 5, pp. 305–330 (1999), page 316, with microstructured optical fibers having sufficiently large air holes, it is possible to realize lower bending losses than the conventional optical fibers.

Optical fibers that are to be wired between optical components (fibers, waveguide circuits, modules including them, etc) need to be spliceable with low loss and low cost, to be operable under small-diameter bends, and to have low multi-mode noise. Bending loss due to small-diameter bends and coupling loss due to inaccurate positioning of fiber elements are common problems. With microstructured optical fibers having spatially uniform average refractive index cladding, it has been difficult to obtain a mode-field diameter that is sufficiently large for low-loss splicing but not so large as to cause optical loss due to leakage.

SUMMARY OF THE INVENTION

The present invention fulfills the above described needs, at least in part by providing a fiber having optical characteristics in which the bending loss of the fundamental mode is low, the bending loss of the first higher-order mode is high, and the mode-field diameter is suited for low-loss optical coupling and low-loss guiding. Terminology used herein in describing the invention is characterized as follows.

A main medium is a medium that can constitute an optical fiber by itself. On the other hand, a sub medium is not necessarily able to constitute an optical fiber by itself. For example, glasses and polymers can be used as main medium or sub medium, while liquids, gases and vacuum can be used as sub medium.

The average refractive index of a region composed of several media i (i=1 . . . M) is defined by the following formula (1).

$$n_{avg} = \left\{ \left( \sum_{i=1}^{M} n^2[i] f[i] \right) \Big/ \left( \sum_{i=1}^{M} f[i] \right) \right\}^{1/2} \quad (1)$$

In formula (1), n[i] and f[i] are respectively the refractive index and the volume of medium i.

The relative refractive index difference Δ of medium 1 with refractive index n1 to medium 0 with refractive index n0 is given by the following formula (2).

$$\Delta = (n_1^2 - n_0^2)/2n_1^2 \quad (2)$$

Where sub medium regions are arranged in main medium 0 or 1, an average refractive index is considered in place of the refractive index of the main medium.

In a structure wherein holes are periodically arranged, the relative hole diameter d/L is the ratio of the hole diameter d to the pitch L of a periodical lattice of the structure.

The first higher-order mode is a mode whose phase index is the highest next to the two fundamental modes.

Advantages of the present invention will become readily apparent from the following detailed description, simply by way of illustration of the best mode contemplated of carrying out the invention. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWINGS

The present invention is illustrated by way of example, and not by way of limitation, in the figures of the accompanying drawing and in which like reference numerals refer to similar elements and in which:

FIGS. 9A and 9B are illustrative of an optical fiber connector having a microstructured fiber in accordance with the present invention spliced with a conventional fiber.

FIGS. 10A and 10B are illustrative of a multi-fiber optical fiber connector having a microstructured optical fiber array in accordance with the present invention spliced with an optical fiber array containing conventional fibers.

FIGS. 11A and 11B are illustrative of a multi-fiber optical fiber array in accordance with the present invention wherein microstructured fibers are spliced with conventional fibers.

FIGS. 12A and 12B are illustrative of another optical fiber connector in accordance with the present invention.

FIG. 13 is an illustration of a cross section taken parallel to the fiber axis of a microstructured optical fiber in accordance with the present invention.

FIG. 14 is an illustration of a cross section taken parallel to the fiber axis of another microstructured optical fiber in accordance with the present invention.

FIGS. 15A and 15B are illustrative of a multi-fiber optical connector in accordance with the present invention similar to the connector shown in FIG. 10.

FIGS. 16A and 16B are illustrative of a multi-fiber optical fiber array in accordance with the present invention similar to the array shown in FIG. 11.

DETAILED DESCRIPTION OF THE INVENTION

Figure 1:
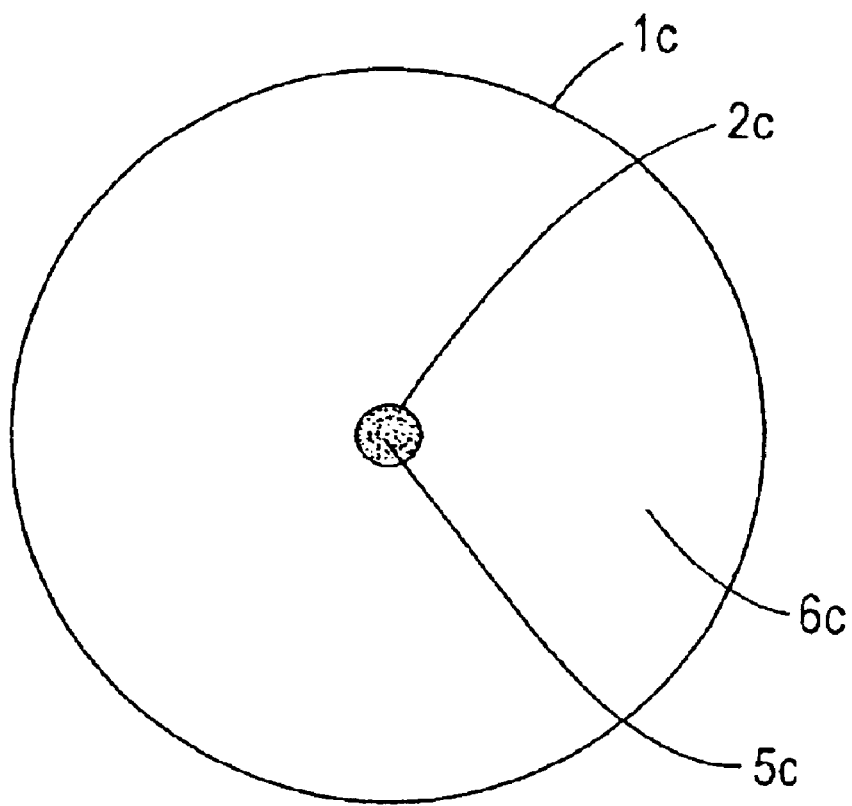
FIG. 1 is an illustration of a cross section taken perpendicular to the fiber axis of a conventional optical fiber.
Figure 2:
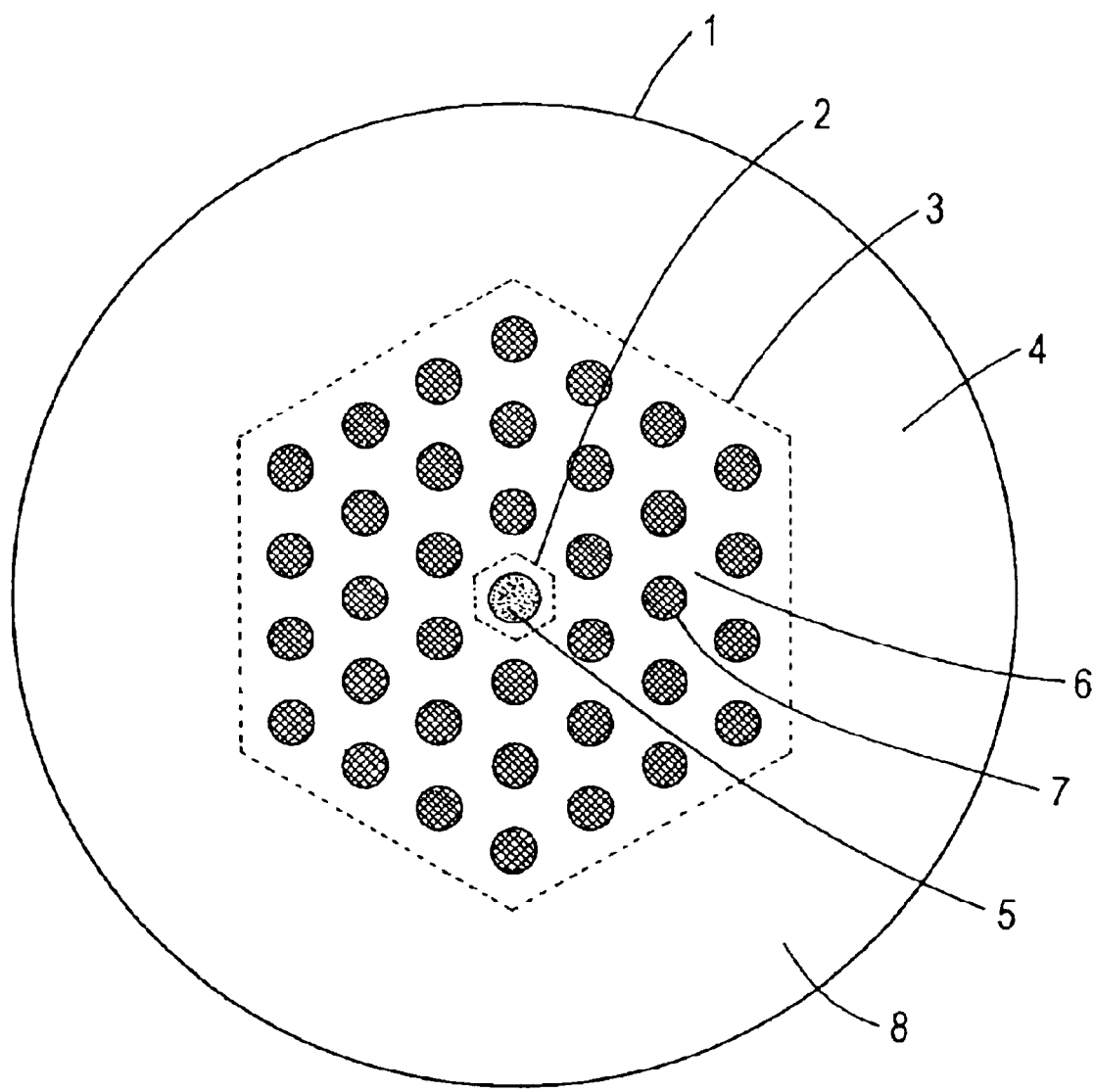
FIG. 2 is an illustration of a cross section taken perpendicular to the fiber axis of a microstructured optical fiber in accordance with the present invention.

FIG. 2 shows the cross section perpendicular to fiber axis of the microstructured optical fiber of a first embodiment. The dimensions in the figure are not necessarily in precise proportion. The microstructured optical fiber 1 has a core region 2, an inner cladding region 3 surrounding the core region, and an outer cladding region 4 surrounding the inner cladding region. The core region is composed of a first main medium 5 surrounded by a region of a second main medium 6. The inner cladding region is composed of the second main medium and a plurality of regions of sub medium 7. The outer cladding region is composed of a third main medium 8. The outer cladding region effects an increase in the bending losses of higher-order modes in addition to improving mechanical strength. The outer boundary of the outer cladding region is a circumference of a diameter, for example, of 125 µm. It is preferable to cover the outer surface of the outer cladding region by a coating medium such as UV-curable resin. The outer diameter of the optical fiber may be smaller than 125 µm, for example 80 µm, so that strain due to bending is reduced. Or, it may be larger than 125 µm, for example 180 µm, so that microbending of the optical fiber is prevented.

It is also preferable to pass the microstructured optical fiber through a screening step with a strain higher than 2.5% during or after fiber-drawing, and thereby to reduce the probability that sections of low strength are included in the fiber. Particularly, after a 2.5% screening, a 2 meter long fiber bent in 15 millimeter diameter will break with a probability less than $10^{-3}$. Moreover, after a 3.5% screening, a 2 meter long fiber bent in 10 millimeter will break with a probability less than $10^{-3}$.

The first main medium is silica glass doped with $GeO_2$. The second and third main medium is pure silica glass. The sub medium is an inert gas such as air and nitrogen gas, so that a region of the sub medium is an air hole. Therefore, by noting the refractive indices of the first, the second, and the third main medium respectively as $n1$, $n2$, and $n4$, the refractive index of the sub medium as $n3$, and the average refractive index of the inner cladding region as $N$, the following relationship holds.

$n1 > n2 > n3$, and $N < n4$.

The average refractive index $N$ of the inner cladding, the relative refractive index difference $\Delta$ of the first main medium to the second main medium, and the shape of the region of the first main medium are selected so that the mode-field diameter of the fundamental mode at a wavelength $\lambda$ between 200 nm and 1700 nm become greater than or equal to 8.0 µm and less than or equal to 50 λ when the sub medium is replaced by the second main medium. As a result, coupling loss in coupling the fundamental mode with an external optical system is low, and leakage loss in the section where the sub medium is replaced is also low. Therefore, the cost and optical loss accompanied with an optical coupling are reduced.

In the microstructured optical fiber of this first embodiment, the shapes of the region of the first main medium and the air holes are circles in the cross section perpendicular to the fiber axis. The air holes are arranged on lattice points of a hexagonal lattice of a constant pitch L. The number of the air holes is 36, and they occupy three layers of the hexagonal lattice. The refractive index in the region of the first main medium is substantially spatially uniform. It is also possible to dope silica glass of the first to the third main medium with germanium, fluorine, chlorine, boron, aluminum, and titanium and to form a refractive index profile. Also, while the index profile in the core region is known as step-index profile, other profiles such as one known as W-shaped profile are also possible. In addition, the arrangement of the air holes need not be a hexagonal lattice. Instead, it is possible to arrange the sub medium regions on a plurality of co-centered circumferences and thereby improve the circularity of the mode field and enhance the coupling efficiency between the conventional optical fibers.

Table 1 below lists structural details of three microstructured fibers A1–A3 exemplifying the first embodiment. Comparisons are made between fibers including the sub medium and fibers wherein the sub medium has been replaced by the second main medium. The mode-field diameter is between 8.0 µm and 50 λ whether of not the sub medium has been replaced by the second main medium.

TABLE 1

|  | (A1) | (A2) | (A3) |
| --- | --- | --- | --- |
| Core diameter [µm] | 4.85 | 5.13 | 5.44 |
| Core Δ [%] | 0.34 | 0.34 | 0.34 |
| Number of holes | 36 | 36 | 36 |
| Pitch L [µm] | 8.08 | 8.55 | 9.07 |
| Hole diameter d [µm] | 3.23 | 3.85 | 4.54 |
| Relative hole diameter d/L | 0.40 | 0.45 | 0.50 |
| Δ of the inner cladding [%] | −4.1 | −5.3 | −6.7 |
| MFD at 1550 nm (*1) [µm] | 8.6 | 8.6 | 8.6 |
| MFD at 1550 nm (*2) [µm] | 12.8 | 12.0 | 11.4 |
| Power fraction in the holes at 1550 nm | 7.3e−5 | 6.2e−5 | 5.4e−5 |

(*1) when sub medium is NOT replaced by the 2nd main medium
(*2) when sub medium is replaced by the 2nd main medium The relative refractive index difference $\Delta$ of the inner cladding to the second main medium is obtained based on that the refractive indices of the second main medium and the sub medium are respectively 1.444 and 1 at 1550 nm wavelength. The boundary of the inner cladding region is defined so that the ratio of the distance from the boundary to a sub medium region neighboring the boundary to the diameter of the sub medium region is substantially equal to the ratio of the distance between two neighboring sub medium regions to the average diameter of them. The inner and the outer boundaries of the inner cladding region are hexagons with edge-lengths of 0.5 L and 3.5 L, respectively.

Figure 3B:
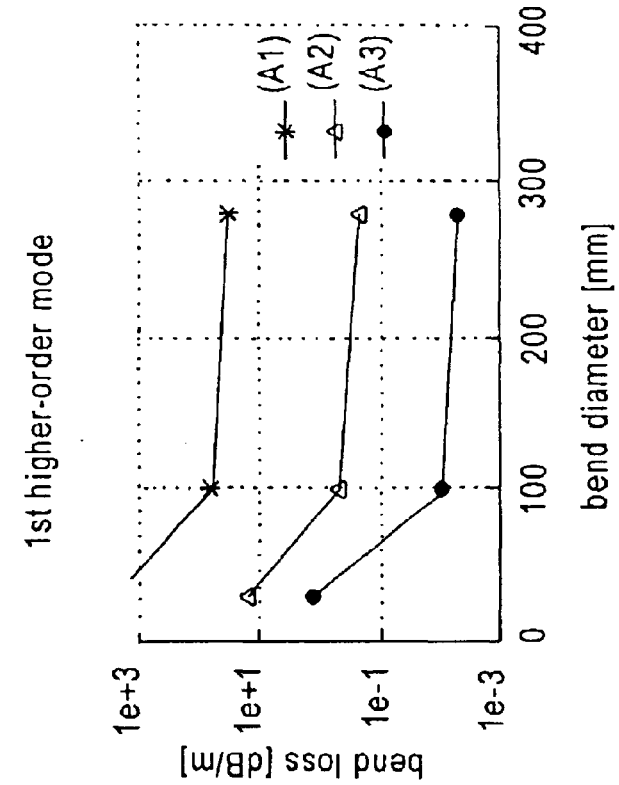
FIGS. 3A and 3B are graphs representing the bending losses, respectively, of the fundamental and the first higher-order mode, respectively, of three optical fibers A1–A3 formed in accordance with the invention of FIG. 2.
Figure 3A:
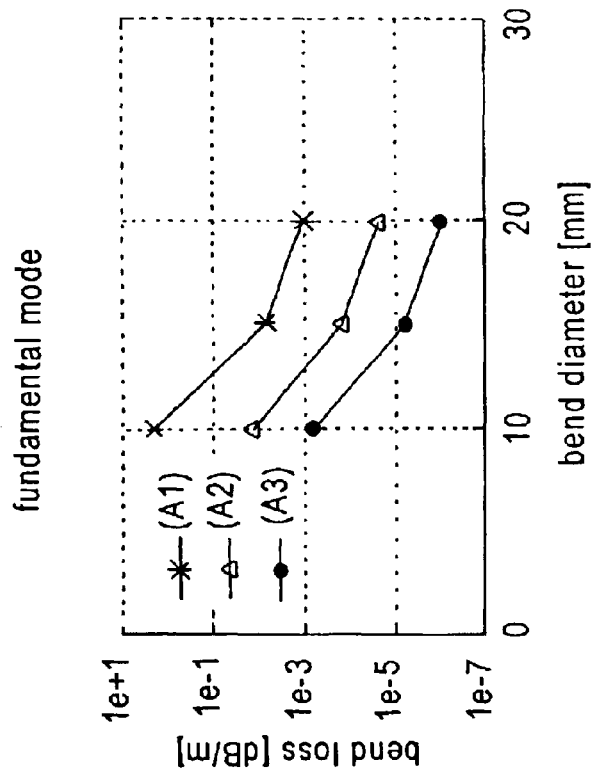

FIGS. 3A and 3B show the bending losses of the fundamental and the first higher-order mode, respectively, of the optical fibers A1–A3. As shown in FIG. 2a, the bending loss of the fundamental mode in A1–A3 is less than 0.1 dB/m at a bending diameter of 15 mm, and is less than 0.1 dB/m even at a 10 mm diameter in A2–A3. As shown in FIG. 2b, the bending loss of the first higher-order mode in A1–A3 is higher than 1 dB/m at a bending diameter of 30 mm, and is higher than 1 dB/m even at a 280 mm diameter in A1. Because of low bending loss of the fundamental mode, those optical fibers can operate under small-diameter bends. Because of high bending loss of the first higher-order mode, the multimode noise due to interference between the fundamental and higher-order modes is low. Although the decrease in the bending loss of the fundamental mode tends to cause decrease in the bending loss of the first higher-order mode and an increase in multimode noise in a conventional fiber, the present invention realizes both a low bending loss of the fundamental mode and a high bending loss of the first higher-order mode by employing a structure in which the refractive index of the outer cladding region is higher than the average refractive index of the inner cladding region. Moreover, since the mode-field diameter is between 8.0 μm and 50 λ either with or without the sub medium regions, it is possible to realize optical coupling with external optical systems with low optical loss and low cost. Such a combination of characteristics has not been found in previously known fibers in which the outer cladding effected improvement of mechanical strength but not an increase of the bending loss of the first higher-order mode. Also, in the optical fibers of the first embodiment, the power fraction located in the holes is lower than $10^{-4}$. As a result, the transmission loss due to absorption or scattering caused by impurities in and around the holes and surface roughness of the holes is reduced, and the transmission loss of the optical fiber is stable and low.

Figure 4:
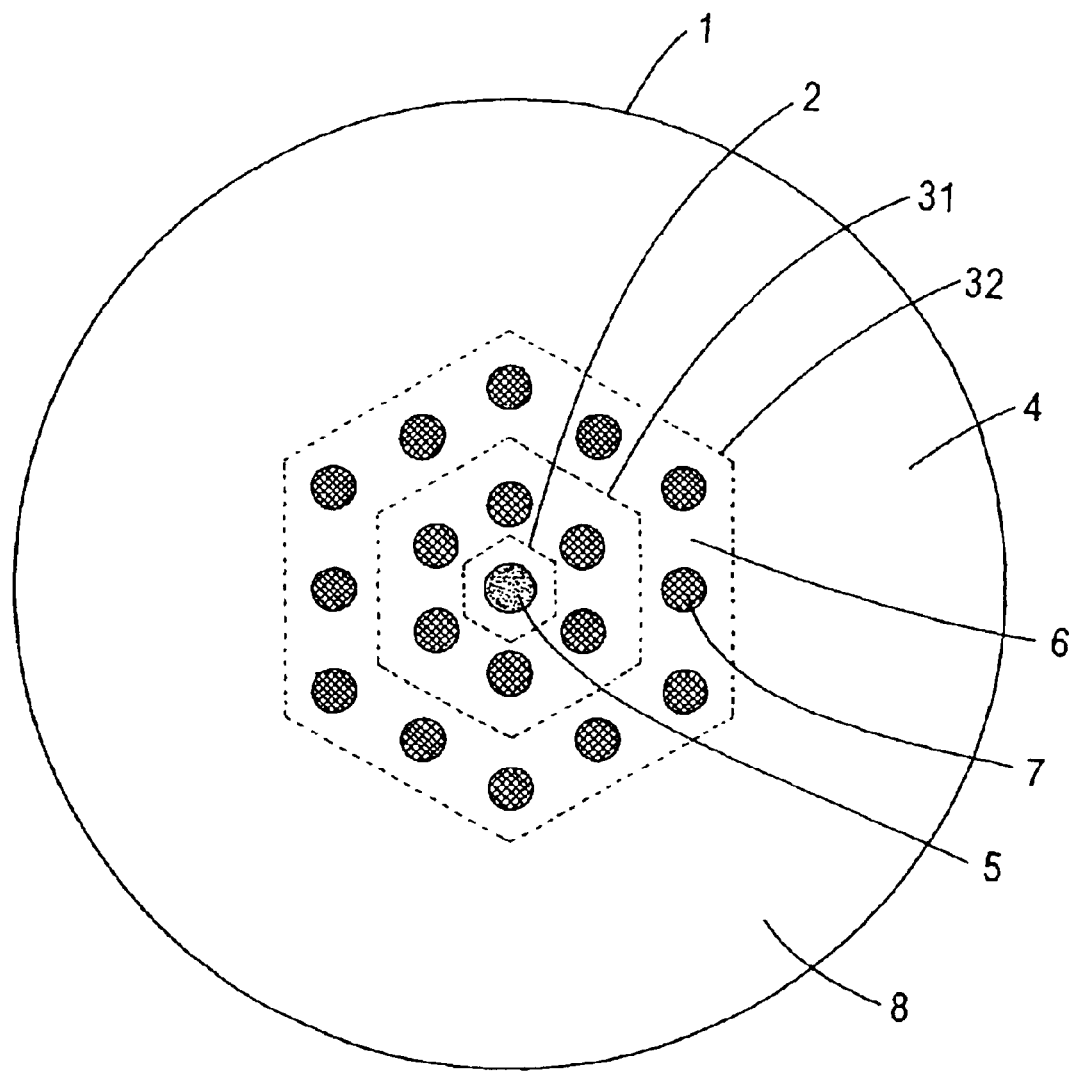
FIG. 4 is an illustration of a cross section taken perpendicular to the fiber axis of a microstructured optical fiber of another embodiment of the invention.

FIG. 4 shows the cross section perpendicular to fiber axis of the microstructured optical fiber of a second embodiment. The dimensions in the figure are not necessarily in precise proportion. The microstructured optical fiber 1 has a core region 2, a first inner cladding region 31 surrounding the core region, a second inner cladding region 32 surrounding the first inner cladding region, and an outer cladding region 4 surrounding the second inner cladding region. The core region is composed of a region of the first main medium 5 surrounded by a region of the second main medium 6. The first and second inner cladding regions are composed of the second main medium and a plurality of regions of sub medium 7. The outer cladding region is composed of a third main medium. As in the first embodiment, the outer boundary of the outer cladding region may have a circumference of a diameter of 125 μm, and it is preferable to cover the outer surface of the outer cladding region by a coating medium such as UV-curable resin. It is also preferable to pass the microstructured optical fiber through a screening step with a strain higher than 2.5% during or after fiber-drawing.

The constitutions of the main and sub mediums, and the shapes of the region of the first main medium and the air holes are the same as those in the first embodiment. The second embodiment 2 is exemplified by ten microstructured optical fibers B1–B5, C1–C3, and D1–D2, structural details thereof shown below in Tables 2 and 3.

TABLE 2

|  | (B1) | (B2) | (B3) | (B4) | (B5) |
| --- | --- | --- | --- | --- | --- |
| Core diameter [μm] | 4.85 | 5.13 | 5.44 | 5.73 | 6.01 |
| Core Δ [%] | 0.34 | 0.34 | 0.34 | 0.34 | 0.34 |
| Number of holes | 18 | 18 | 18 | 18 | 18 |
| Pitch in the 1st inner cladding L1 [μm] | 8.08 | 8.55 | 9.07 | 9.55 | 10.02 |
| Hole diameter in the 1st inner cladding d1 | 3.23 | 3.85 | 4.54 | 5.25 | 6.01 |
| Relative hole diameter d1/L1 | 0.40 | 0.45 | 0.50 | 0.55 | 0.60 |
| Δ of the 1st inner cladding [%] | −4.1 | −5.3 | −6.7 | −8.3 | −10.2 |
| Pitch in the 2nd inner cladding L2 [μm] | 8.08 | 8.55 | 9.07 | 9.55 | 10.02 |
| Hole diameter in the 2nd inner cladding d2 | 3.23 | 3.85 | 4.54 | 5.25 | 6.01 |
| Relative hole diameter d2/L2 | 0.40 | 0.45 | 0.50 | 0.55 | 0.60 |
| Δ of the 2nd inner cladding [%] | −4.1 | −5.3 | −6.7 | −8.3 | −10.2 |
| MFD at 1550 nm (*1) [μm] | 8.6 | 8.6 | 8.6 | 8.6 | 8.6 |
| MFD at 1550 nm (*2) [μm] | 12.8 | 12.0 | 11.4 | 11.0 | 10.7 |
| Power fraction in the holes at 1550 nm | 7.6e−5 | 6.6e−5 | 5.5e−5 | 4.9e−5 | 4.5e−5 |

(*1) when sub medium is NOT replaced by the 2nd main medium
(*2) when sub medium is replaced by the 2nd main medium

TABLE 3

|  | (C1) | (C2) | (C3) | (D1) | (D2) |
| --- | --- | --- | --- | --- | --- |
| Core diameter [μm] | 6.01 | 6.01 | 6.01 | 5.73 | 5.73 |
| Core Δ [%] | 0.34 | 0.34 | 0.34 | 0.34 | 0.34 |
| Number of holes | 18 | 18 | 18 | 18 | 18 |
| Pitch in the 1st inner cladding L1 [μm] | 10.02 | 10.02 | 10.02 | 9.55 | 9.55 |
| Hole diameter in the 1st inner cladding d1 | 6.01 | 6.01 | 6.01 | 5.25 | 5.25 |
| Relative hole diameter d1/L1 | 0.60 | 0.60 | 0.60 | 0.55 | 0.55 |
| Δ of the 1st inner cladding [%] | −8.2 | −8.6 | −9.4 | −7.1 | −7.6 |
| Pitch in the 2nd inner cladding L2 [μm] | 11.32 | 11.02 | 10.52 | 10.50 | 10.03 |
| Hole diameter in the 2nd inner cladding d2 | 6.01 | 6.01 | 6.01 | 5.25 | 5.25 |
| Relative hole diameter d2/L2 | 0.53 | 0.55 | 0.57 | 0.50 | 0.52 |
| Δ of the 2nd inner cladding [%] | −7.3 | −7.9 | −8.9 | −6.4 | −7.3 |
| MFD at 1550 nm (*1) [μm] | 8.6 | 8.6 | 8.6 | 8.6 | 8.6 |

TABLE 3-continued

| | (C1) | (C2) | (C3) | (D1) | (D2) |
|---|---|---|---|---|---|
| MFD at 1550 nm (*2) [$\mu$m] | 12.8 | 12.0 | 11.4 | 11.0 | 10.7 |
| Power fraction in the holes at 1550 nm | 4.4e−5 | 4.4e−5 | 4.4e−5 | 4.9e−5 | 4.9e−5 |

(*1) when sub medium is NOT replaced by the 2nd main medium
(*2) when sub medium is replaced by the 2nd main medium The first and second inner cladding regions include respectively 6 and 12 holes, which are arranged on lattice points of hexagonal lattices of each inner cladding regions. If the lattice pitch and the hole diameter of the k-th inner cladding region are noted as Lk and dk (k=1,2), d1=d2 and L1=L2 in fibers B1–B5, so that the average refractive indices of the first and second inner cladding regions are equal in B1–B5. On the other hand, d1=d2 and L1<L2 in fibers C1–D2, so that the second inner cladding region has a higher average refractive index than the first inner cladding region in C1–D2. As shown in the tables, the mode-field diameter is between 8.0 $\mu$m and 50 $\lambda$ either the sub medium is replaced by the second main medium or not. The refractive indices of the mediums are the same as those in embodiment 1, and the way of definition of the boundaries of the inner cladding regions is also similar to that in embodiment 1. That is, the inner boundary of the first inner cladding is a hexagon with edge length of 0.5 L1, the outer boundary of the first inner cladding region is a hexagon with edge length of 0.5*(L1+2L2) and equivalent to the inner boundary of the second inner cladding region, and the outer boundary of the second inner cladding region is a hexagon with edge length of 2.5 L2. The centers of these hexagons coincide with the fiber center.

Figure 5:
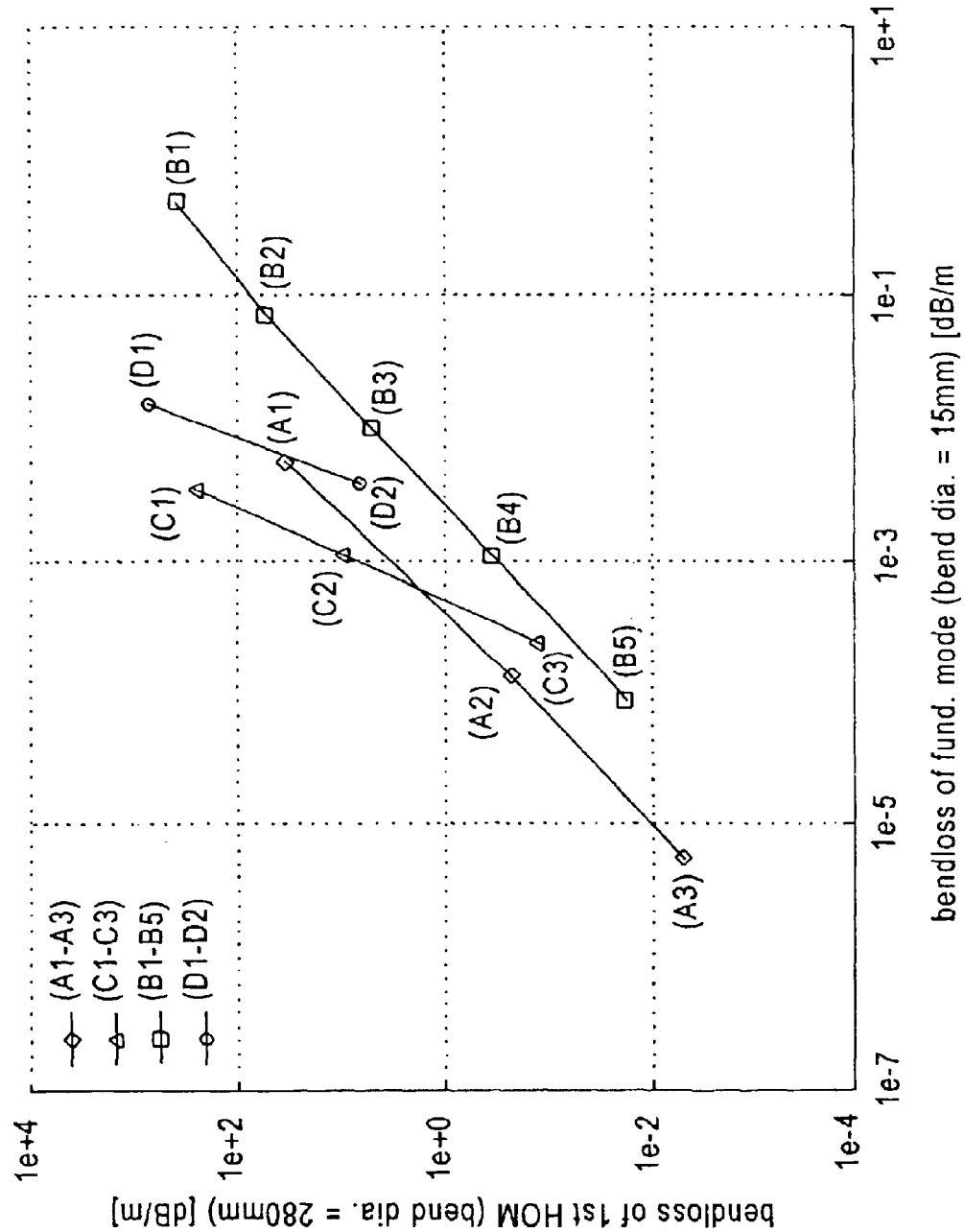
FIG. 5 is a graph representing the bending losses of the fundamental and the first higher-order mode of optical fibers formed in accordance with the invention of FIGS. 2 and 4.

FIG. 5 shows the bending losses of the fundamental and the first higher-order mode of the optical fibers B1–D2. If the fibers C1–D2 are compared to the fibers B1–B5, the former has lower bending losses of the fundamental mode and higher bending losses of the first higher-order mode, while the former and the latter do not differ significantly in mode-field diameter. Therefore, the former are more suited for optical wiring applications than the latter. The former are structures in which the second inner cladding has higher average refractive index than the first inner cladding, and the latter are structures in which the average refractive indices of the first and second inner cladding regions are equal.

It also should be noted that the fibers A1–A3 of embodiment 1 are more suited than the fibers B1–B3 while the difference between Ak and Bk (k=1, . . . , 3) is only in the number of the holes. Such influence of the number of the holes on the performance as fibers for wiring applications has not been found out in previously known fibers.

As in the first embodiment, because of low bending loss of the fundamental mode, those optical fibers can operate under small-diameter bends. Because of high bending loss of the first higher-order mode, the multimode noise due to interference between the fundamental and higher-order modes is low. Moreover, since the mode-field diameter is between 8.0 $\mu$m and 50 $\lambda$ either with or without the sub medium regions, it is possible to realize optical coupling with external optical systems with low optical loss and low cost. Also, the power fraction located in the holes is lower than $10^{-4}$, so that the transmission loss due to absorption or scattering caused by impurities in and around the holes and surface roughness of the holes is reduced, and the transmission loss of the optical fiber is stable and low.

Figure 6:
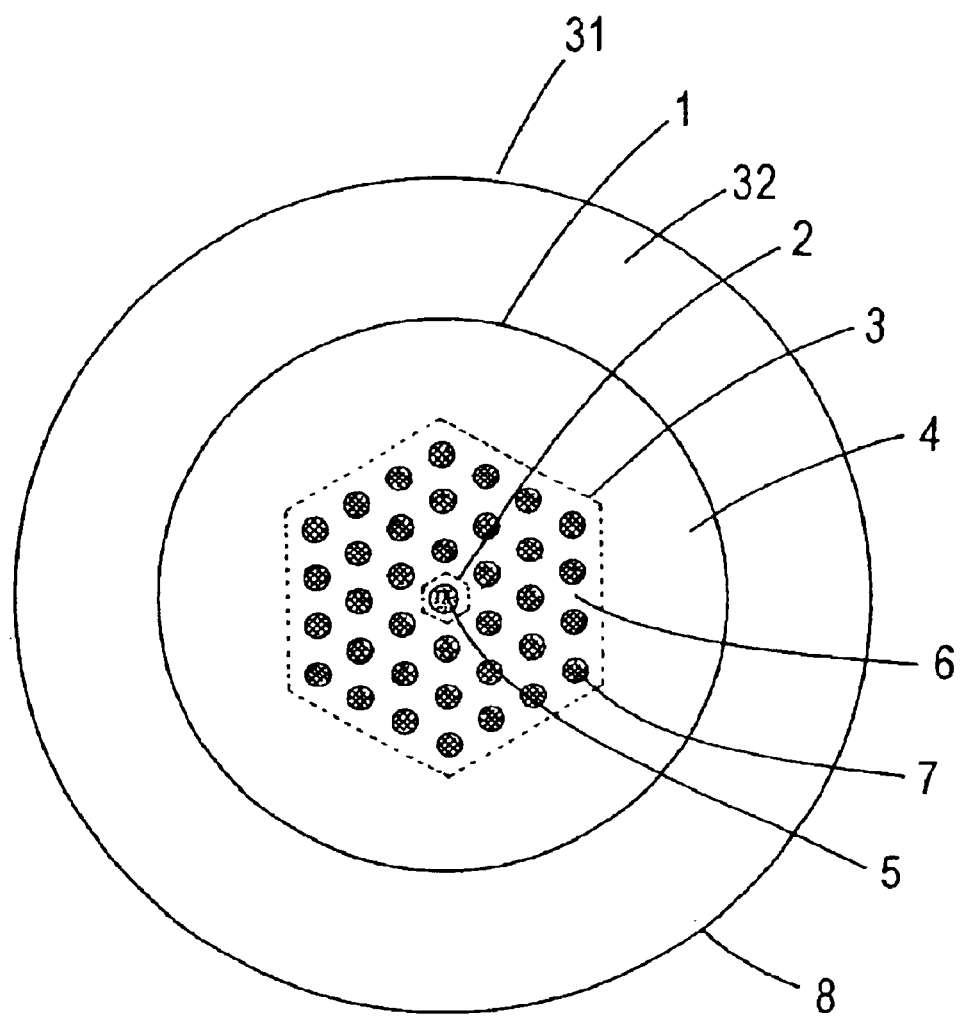
FIG. 6 is illustrative of a coated microstructured optical in accordance with the invention of FIG. 2.

FIG. 6 shows a coated microstructured optical fiber 31 covered by a first coating 32. The first coating, typically UV-curable resin, protects the surface of the fiber against scratching, which is a cause of fiber breakage, and against water, which is a cause of deterioration in the loss and the strength. Also, the first coating may have a dimension and strength enough to prevent the occurrence of extremely-small-diameter bends less than a few millimeters.

Figure 7:
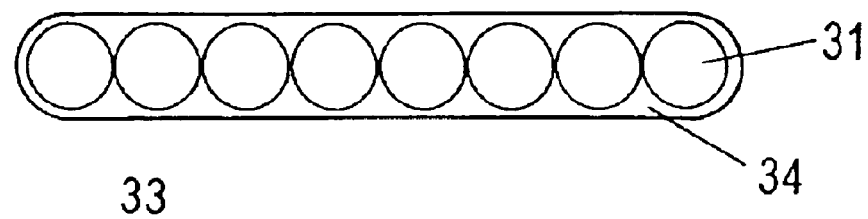
FIG. 7 is illustrative of a microstructured optical fiber ribbon comprising coated microstructured optical fibers in accordance with the present invention.

FIG. 7 shows a microstructured optical fiber ribbon 33 having the coated microstructured optical fiber 31. The microstructured optical fiber ribbon 33 has an array of a plurality (typically two to twenty) of coated microstructured optical fibers, and the second coating 34 covering the coated fibers together. The second coating is typically UV-curable resin. The ribbon can improve the spatial density of optical wiring, and is easier to splice and more robust against small-diameter bends than the conventional fiber ribbons.

Figure 8:
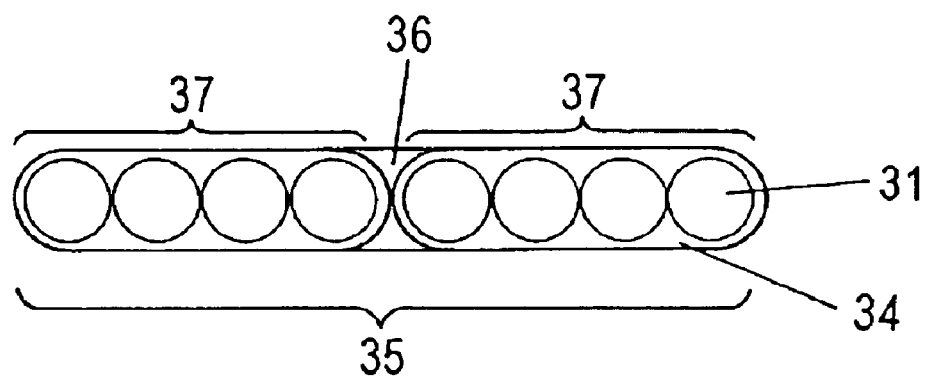
FIG. 8 is illustrative of a separable microstructured optical fiber ribbon in accordance with the present invention.
Figure 17A:
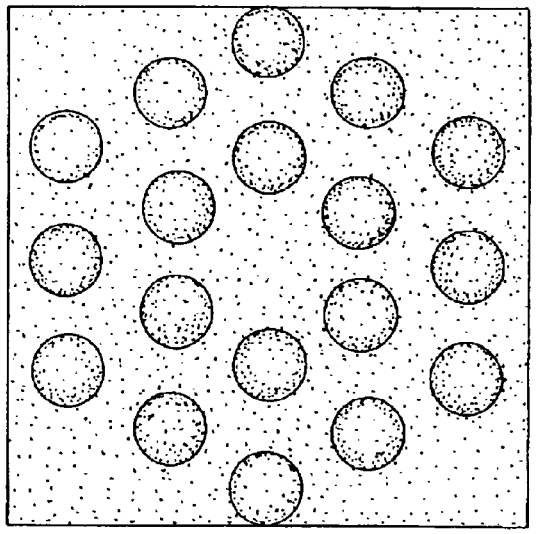
FIGS. 17A–17D are images of the cross sections of the fabricated optical fibers of the present invention taken by scanning electron microscope.
Figure 17C:
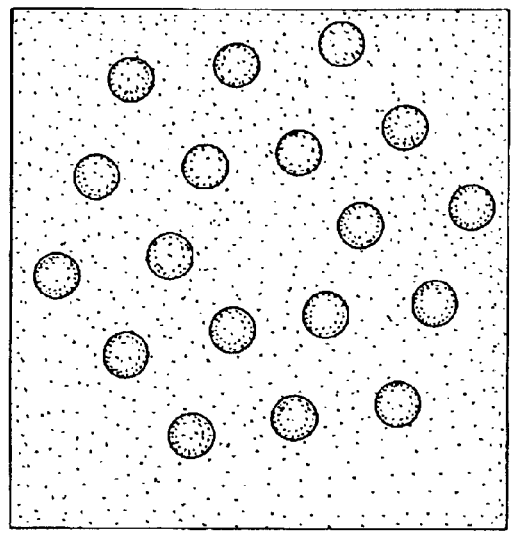
Figure 17B:
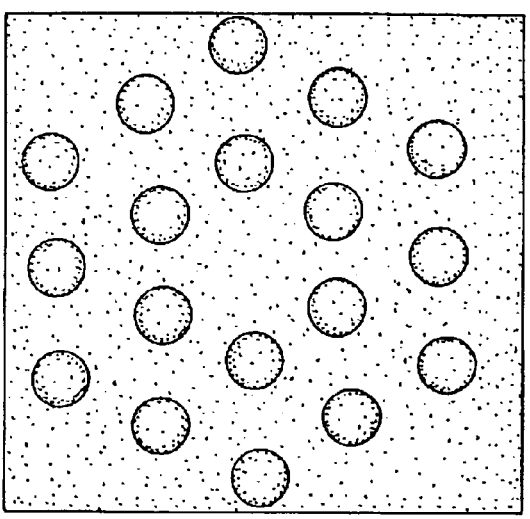
Figure 17D:
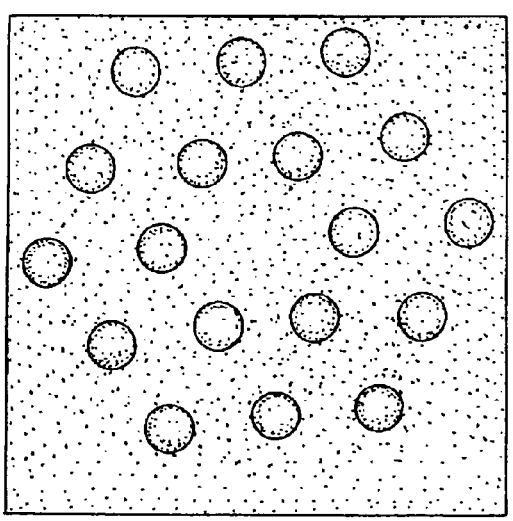

FIG. 8 shows a separable microstructured optical fiber ribbon 35. The separable ribbon has an array of a plurality (typically two to four) of coated fiber groups 37, and the third coating 36 covering the coated fiber groups together. The third coating is typically UV-curable resin. The coated fiber group has an array of a plurality (typically two to ten) of coated microstructured fibers, and the second coating covering the coated microstructured fibers together.

FIG. 9 shows an optical fiber connector 41 having a microstructured fiber 1. The optical fiber connector has a ferrule 42 and a flange 44. The flange has a brim 45. The brim eases positioning of the connector. The ferrule has a cavity having an inner diameter slightly larger than 125 $\mu$m, which is the outer diameter of the glass region of the microstructured optical fiber 1. A section of the microstructured optical fiber including a fiber end is inserted into the cavity of the ferrule. At a splice part 43, the end of the microstructured optical fiber is spliced by arc fusion or mechanically with the end of a conventional optical fiber 1c that does not have sub medium regions. It is preferable that the mode-field diameter of the conventional optical fiber 1c substantially coincides with that of the microstructured optical fiber 1 at the spliced end. The outer diameter of the conventional optical fiber 1c is substantially the same as that of the microstructured optical fiber. The other end of the conventional optical fiber has a polished surface, which becomes the interface when the connector is connected with another optical connector. The polished surface can take well-known shapes such as a flat plane or a sphere. In the present embodiment of optical fiber connector, the sub medium regions of the microstructured optical fiber are protected from the entrance of particles and solvents accompanying the polishing process, and contaminants such as water included in the environment of the connector, so that the reliability of the connector and microstructured fiber is high.

FIG. 10 shows a multi-fiber optical fiber connector 41b having a microstructured optical fiber ribbon such as ribbon 33 of FIG. 7, which can be replaced with a separable microstructured optical fiber ribbon such as ribbon 35 of FIG. 8. The multi-fiber connector 41b has a multi-fiber ferrule 48 having a brim 47. The brim eases positioning of the connector. The ferrule has one or more guide holes 46 that ease positioning of the connector, and a plurality of cavities that have inner diameters slightly larger than 125 µm, which is the outer diameter of the microstructured optical fiber. In a section including the fiber end of a microstructured optical fiber, the coatings are removed, and that section is inserted in a cavity of the ferrule. At a splice part 43b, each microstructured optical fiber is spliced with a conventional optical fiber 1c by arc fusion or mechanically. As in the connector 41 of FIG. 9, the other end of each conventional fiber has polished surfaces. This multi-fiber connector can realize a high reliability because the sub medium regions of the microstructured optical fibers are separated from the environment.

FIG. 11 shows a fiber array 49 having a microstructured optical fiber ribbon such as ribbon 33 of FIG. 7, which can be replaced with a separable microstructured optical fiber ribbon such as ribbon 35 of FIG. 8. The fiber array 49 has a substrate 50 having v-grooves 52, whose shapes are suited to settle optical fibers of 125 µm diameter on. In a section including the fiber end of a microstructured optical fiber, the coatings are removed, and that section is settled on the v-grooves and fixed by fixing medium 51 (typically resin). At a splice part 43c, each microstructured optical fiber is spliced with a conventional optical fiber 1c by arc fusion or mechanically. As in the connector 41 of FIG. 9, the other end of each conventional fiber has polished surfaces. This fiber array connector can realize a high reliability because the sub medium regions of the microstructured optical fibers are separated from the environment.

FIG. 12 shows an optical fiber connector 41d having a microstructured fiber 1, where the ferrule 42d, the flange 44d, and the brim 45d are substantially the same as those in the optical fiber connector 41 in FIG. 9. In this connector, the end of the microstructured optical fiber has a section 12, wherein the sub medium is replaced with the second main medium, or section 12b, wherein a sealing medium is filled in the sub medium regions. The end of the microstructured fiber has a polished surface, which becomes the interface when the connector is connected with another optical connector. This connector also can realize a high reliability because the sub medium region is separated from the environment.

FIG. 13 shows a cross section taken parallel to the fiber axis of a microstructured optical fiber having section 12 described above with respect to FIG. 12. In a standard section 11, the microstructured fiber has the cross-sectional structure described in the first or second embodiments. In section 12, the air holes are replaced by silica glass. There is the transition section 13 between the standard section 11 and the section 12, where the diameters of the holes vary along the fiber length. Sections 12 and 13 can be formed by heating a section of the fiber selectively, and cause shrinking of the holes by surface tension. In addition, the transition section can be formed by the temperature gradation along the fiber length.

FIG. 14 shows a cross section taken along the fiber axis of another form of processed microstructured optical fiber 1 having section 12b, described above with respect to FIG. 12. In the standard section 11, the microstructured fiber has the cross-sectional structure described in the first or second embodiments. In the section 12b, the air holes are filled with a sealing medium 72, which is typically resin.

FIG. 15 shows a multi-fiber optical fiber connector 41e having a microstructured optical fiber ribbon 33 such as the ribbon 33 of FIG. 7, which can be replaced with a separable microstructured optical fiber ribbon such as the ribbon 35 of FIG. 8. The ferrule 48e and the brim 47e are substantially the same as those in the multi-fiber optical fiber connector 41b in FIG. 10. In this connector, each of the ends of the microstructured optical fibers has a section 12 or 12b such as shown in FIGS. 13 and 14, and a polished surface, which becomes the interface when the connector is connected with another optical connector. This connector also can realize a high reliability because the sub medium region is separated from the environment.

FIG. 16 shows a fiber array 49f having a microstructured optical fiber ribbon such as the ribbon 33 of FIG. 7, which can be replaced with a separable microstructured optical fiber ribbon such as the ribbon 35 of FIG. 8. The substrate 50f, the v-groove 52f, and the fixing medium 51f are substantially the same as those in the fiber array 49 in FIG. 11. In this fiber array, each of the ends of the microstructured optical fibers has a section 12 or 12b such as shown in FIGS. 13 and 14, and a polished surface, which becomes the interface when the connector is connected with another optical connector. This fiber array also can realize a high reliability because the sub medium region is separated from the environment.

The inventors have fabricated and evaluated several optical fibers of the present invention. FIG. 17 shows the images of the cross sections of the fabricated optical fibers (a) to (d) taken by scanning electron microscope. Each of the four fibers has a similar structure to that of the second embodiment shown in FIG. 4, so that each fiber has a core, a first inner cladding, a second inner cladding, and an outer cladding. The core has a region made of germanium-doped silica surrounded by pure silica, wherein the relative refractive index difference Δ of the doped region to pure silica is about 0.33% and the diameter of the region is about 8.5 µm. The inner cladding regions are made of pure silica glass and air holes embedded in the glass. The outer cladding is made of pure silica. The difference between the four fibers is in the diameter of the holes.

Table 4 summarizes the optical properties and structure of the fabricated fibers. As shown in the table, the fabricated fibers have low bending losses for a bending diameter of at least above 10 mm.

TABLE 4

| Property | Wavelength [nm] | | Fiber | | | |
| --- | --- | --- | --- | --- | --- | --- |
| | | | (a) | (b) | (c) | (d) |
| MFD [µm] | 1550 | | 8.5 | 8.5 | 8.9 | 8.8 |
| Effective area [µm^2] | 1550 | | 60.6 | 59.8 | 65.8 | 66.0 |
| Bending loss [dB/km] | 1550 | bend. dia. [mm] | | | | |
| | | 10 | <0.1 | <0.1 | <0.1 | <0.1 |
| | | 15 | <0.1 | <0.1 | <0.1 | <0.1 |
| | | 20 | <0.1 | <0.1 | <0.1 | <0.1 |
| Cutoff wavelength (*1) [nm] | | | 1444 | 1180 | 1095 | 1104 |

TABLE 4-continued

| Property | Wavelength [nm] | | Fiber (a) | Fiber (b) | Fiber (c) | Fiber (d) |
|---|---|---|---|---|---|---|
| Attenuation [dB/km] | 1550 | | 0.23 | 0.24 | 0.24 | 0.30 |
|  | 1310 | | 0.48 | 0.50 | 0.53 | 0.53 |
| Dispersion [ps/nm/km] | 1550 | | 28.1 | 28.0 | 27.2 | 27.4 |
| Dispersion slope [ps/nm^2/km] | 1550 | | 0.0711 | 0.0708 | 0.0707 | 0.0702 |
| Hole diameter [μm] | | first inner cladding | 6.00 | 5.00 | 4.16 | 4.15 |
|  | | second inner cladding | 5.75 | 4.60 | 3.77 | 4.07 |

(*1) Fiber length is 2 m. and wound one turn on a diameter of 280 mm, complying with ITU-T G. 650.

Also, the mode-field diameter (MFD) of the fundamental mode is 8.5 to 8.9 μm when the air holes are retained. When the air holes are replaced with pure silica glass, for example by collapsing air holes by arc fusion, the mode-field diameter is expected to increase to about 10.3 μm from a calculation based on the index difference and diameter of the core.

The effective area of the fundamental mode is 59 to 66 μm². It is preferable that the effective area is larger than 20 μm², or more preferably 50 μm, for suppressing nonlinear optical effects during optical signal transmission.

The cutoff wavelength, above which the higher-order mode experiences sufficiently high attenuation during propagation so that multimode noise is suppressed, is measured in a manner complying with ITU-T G.650, with a sample of a length 2 m and wound one turn on a 280 mm-diameter. It is preferable that the cutoff wavelength is lower than 0.530 nm for usage of the optical fiber in the widely used wavelength band of 1530 to 1580 nm, and more preferably lower than 1300 nm for usage in a further broad wavelength band of 1300 to 1700 nm.

The optical attenuation coefficient measured by the cutback method is 0.23 to 0.30 dB/km. It is preferable that the attenuation coefficient is lower than 0.30 dB/km for optical transmission over a distance longer than 1 km, and more preferably lower than 0.25 dB/km for optical transmission over a distance longer than 1 km and/or for reducing the cost of the optical transmitter and the optical receiver by increasing the loss budget of the transmission link.

The chromatic dispersion of the fabricated fibers is 27 to 29 ps/nm/km and the chromatic dispersion slope is about 0.07 ps/nm²/km. It is preferable that the dispersion and dispersion slope is positive so that the widely-available transmitter designed for a link made of the standard ITU-T G.652 single-mode fiber can be used.

Figure 18:
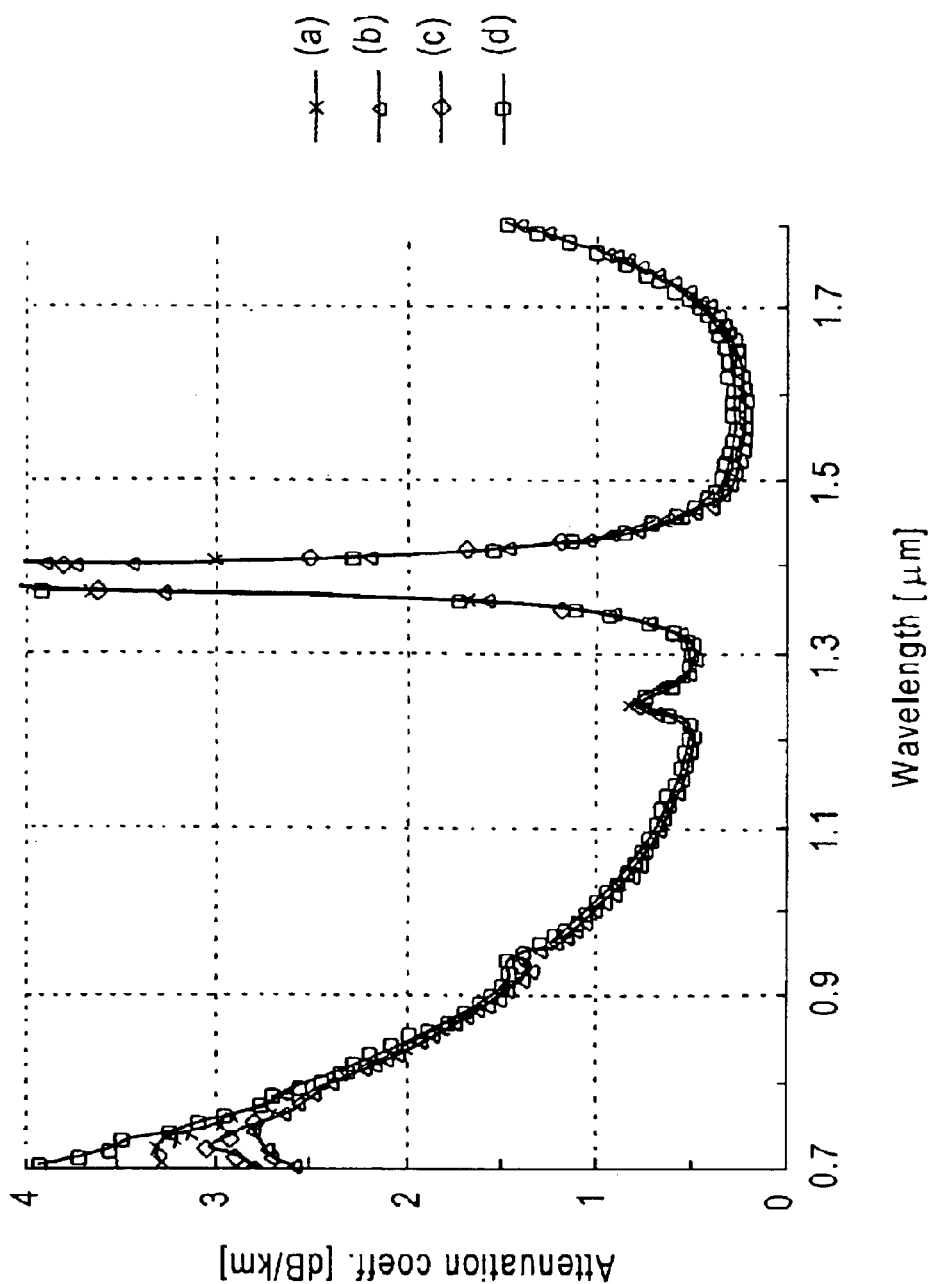
FIG. 18 is the spectra of attenuation coefficient of the fabricated optical fibers of the present invention measured by the cutback method.

FIG. 18 shows the spectra of the optical attenuation coefficients of the fabricated fibers measured by the cutback method. As shown in the figure, the attenuation coefficient of fiber (a) is lower than 0.25 dB/km in 1520 to 1650 nm band, lower than 0.30 dB/km in 1500 to 1660 nm band, and lower than 1 dB/km in 1000 to 1300 nm band and 1460 to 1760 nm band. Such a low attenuation over a broad wavelength range is preferable for usage in optical transmission of large capacity, long distance and/or low cost.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

For example, the ribbon arrays and connectors may comprise other known microstructured optical fibers as well as those fibers of the above described first and second embodiments.

What is claimed is:

1. An optical fiber comprising a core, an inner cladding surrounding the core, and an outer cladding surrounding the inner cladding, wherein
    the core is a first main medium having a refractive index n1 at a wavelength λ between 200 nm and 1700 nm;
    the inner cladding, for at least a portion of the fiber, comprises a second main medium having a refractive index n2 lower than n1 at the wavelength λ, and a plurality of sub medium regions having refractive index n3 lower than n2 at the wavelength λ;
    the outer cladding is a third main medium having a refractive index n4 higher than an average refractive index N of the inner cladding at the wavelength λ;
    said core, inner cladding, outer cladding and sub medium regions extending along a fiber axis;
    a bending loss of a fundamental mode of the fiber at a wavelength λ is lower than 0.1 dB/m at a bending diameter of 15 mm;
    a mode-field diameter of the fundamental mode at an end portion of the fiber at the wavelength λ is between 8.0 μm and 50 λ; and
    a bending loss of a first higher-order mode at the wavelength λ is higher than 1 dB/m at a bending diameter of 30 mm.

2. An optical fiber as recited in claim 1, wherein the outer cladding has an outer diameter between 124 μm and 126 μm, and the optical fiber can withstand a strain of higher than 2.5%.

3. An optical fiber as recited in claim 1, wherein the first to the third main medium is silica glass that is pure or doped with one or more dopants belonging to a group composed of germanium, fluorine, chlorine, phosphorus, nitrogen, boron, aluminum, titanium, erbium, ytterbium, neodymium, praseodymium, and bismuth, and the sub medium is a gas or vacuum.

4. An optical fiber as recited in claim 3, wherein the inner cladding has a first inner cladding region surrounding the core, and a second inner cladding region surrounding the first inner cladding region, and an average refractive index N1 of the first inner cladding region is lower than an average refractive index N2 of the second inner cladding region at the wavelength λ.

5. An optical fiber as recited in claim 3, wherein sub medium regions of the inner cladding at the end portion of the fiber have a refractive index of n2 at the wavelength λ.

6. An optical fiber as recited in claim 5, wherein the sub medium regions of the inner cladding at the end of the fiber is the same material as the second main medium.

7. An optical connector comprising a ferrule containing one or more optical fibers as recited in claim 5, wherein the end portions of the optical fibers are polished and positioned at an end surface of the ferrule.

8. An optical fiber array comprising a plurality of optical fibers as recited in claim 5, wherein the end portions of the optical fibers are polished and positioned at an end surface of the array.

9. An optical fiber as recited in claim 3, wherein the ratio of optical power located in the sub medium regions to the total optical power propagating in the fiber in the fundamental mode at the wavelength $\lambda$ is less than $10^{-4}$.

10. An optical fiber of claim 9, wherein the sub medium regions at the end portion of the fiber are sealed with a medium having a refractive index of n5, higher than n3, at the wavelength $\lambda$, and an optical attenuation coefficient less than 10 dB/mm at the wavelength $\lambda$.

11. An optical connector comprising a ferrule containing one or more optical fibers as recited in claim 10, wherein the end portions of the optical fibers are polished and positioned at an end surface of the ferrule.

12. An optical fiber array comprising a plurality of optical fibers as recited in claim 10, wherein the end portions of the optical fibers are polished and positioned at an end surface of the array.

13. An optical fiber as recited in claim 1, wherein a bending loss of the first higher-order mode is higher than 1 dB/m at a bending diameter of 280 mm.

14. An optical fiber as recited in claim 1, wherein the mode-field diameter of the fundamental mode at the end portion of the fiber at the wavelength $\lambda$ is between 8.0 $\mu$m and 10$\lambda$.

15. An optical fiber as recited in claim 1, wherein an optical attenuation coefficient of the fundamental mode at said portion of the fiber at the wavelength $\lambda$ is lower than 0.30 dB/km.

16. An optical fiber as recited in claim 15, wherein an optical attenuation coefficient of the fundamental mode at said portion of the fiber at the wavelength $\lambda$ is lower than 0.25 dB/km.

17. An optical connector comprising a ferrule containing one or more optical fibers as recited in claim 15 and one or more non-microstructured optical fibers, each of said optical fibers having an end connected to one end of a respective one of the non-microstructured optical fibers, another end of each non-microstructured optical fiber being polished.

18. An optical fiber array comprising a plurality of optical fibers as recited in claim 15, each of said optical fibers having an end connected to one end of a respective non-microstructured optical fiber, another end of each non-microstructured optical fiber being polished.

19. An optical fiber ribbon comprising an array of coated optical fibers as recited in claim 1, each optical fiber of the array having a first coating, and the array of coated optical fibers are covered by a second coating.

20. An optical fiber ribbon as recited in claim 19, wherein said array comprises a plurality of groups of coated fibers, and further comprises a third coating covering at least a portion of each of said groups.

21. An optical connector comprising a ferrule containing one or more optical fibers as recited in claim 1 and one or more non-microstructured optical fibers, each of said optical fibers having an end connected to one end of a respective one of the non-microstructured optical fibers, another end of each non-microstructured optical fiber being polished.

22. An optical fiber array comprising a plurality of optical fibers as recited in claim 1, each of said optical fibers having an end connected to one end of a respective non-microstructured optical fiber, another end of each non-microstructured optical fiber being polished.

23. An optical fiber comprising a core region and a cladding region surrounding the core region, said core region and cladding region extending along a fiber axis; wherein a bending loss of a fundamental mode of the fiber at a wavelength $\lambda$ between 200 nm and 1700 nm is lower than 0.1 dB/m at a bending diameter of 15 mm;

a mode-field diameter of the fundamental mode at an end of the fiber at the wavelength $\lambda$ is between 8.0 $\mu$m and 50 $\lambda$; and a bending loss of a first higher-order mode at the wavelength $\lambda$ is higher than 1 dB/m at a bending diameter of 30 mm.

24. An optical fiber as recited in claim 23, wherein the cladding region comprises a main medium and a plurality of sub medium regions, thereby forming a microstructure fiber.

25. An optical fiber as recited in claim 23, wherein an optical attenuation coefficient of the fundamental mode at the wavelength $\lambda$ is lower than 0.30 dB/km.

26. An optical fiber as recited in claim 25, wherein an optical attenuation coefficient of the fundamental mode at the wavelength $\lambda$ is lower than 0.25 dB/km.

* * * * *